United States Patent
Sakurai et al.

(10) Patent No.: US 8,763,953 B2
(45) Date of Patent: Jul. 1, 2014

(54) AIRCRAFT FLAP ACTUATOR ASSEMBLY

(75) Inventors: Seiya Sakurai, Seattle, WA (US); James M. Wheaton, Collierville, TN (US); Stephen J. Fox, Everett, WA (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 12/835,925

(22) Filed: Jul. 14, 2010

(65) Prior Publication Data
US 2012/0012696 A1 Jan. 19, 2012

(51) Int. Cl.
*B64C 9/00* (2006.01)

(52) U.S. Cl.
USPC .......... 244/99.3; 244/99.2; 244/213; 244/215

(58) Field of Classification Search
USPC ........................ 244/99.2, 99.3, 213, 214, 215
See application file for complete search history.

(56) References Cited

U.S. PATENT DOCUMENTS

| | | | | |
|---|---|---|---|---|
| 2,791,385 A | * | 5/1957 | Johnson | 244/213 |
| 3,767,140 A | * | 10/1973 | Johnson | 244/216 |
| 4,381,093 A | | 4/1983 | Rudolph | |
| 4,542,869 A | | 9/1985 | Brine | |
| 4,763,862 A | | 8/1988 | Steinhauer et al. | |
| 5,163,534 A | * | 11/1992 | Hillman | 184/27.1 |
| 2009/0308982 A1 | | 12/2009 | Schlipf | |
| 2010/0001125 A1 | * | 1/2010 | Cavalier et al. | 244/99.3 |

FOREIGN PATENT DOCUMENTS

WO PCT/US2011/040352 9/2011

* cited by examiner

*Primary Examiner* — Timothy D Collins
*Assistant Examiner* — Nicholas McFall
(74) *Attorney, Agent, or Firm* — Parsons Behle & Latimer (57) ABSTRACT

An aircraft flap actuator assembly includes at least one fixed support, at least one track having a curvilinear track surface connected to the fixed support, at least one flap support adapted to traverse the curvilinear track surface, a trailing edge flap connected to the at least one flap support and a flap actuator engaging the at least one flap support.

7 Claims, 9 Drawing Sheets

AIRCRAFT FLAP ACTUATOR ASSEMBLY

TECHNICAL FIELD

The disclosure generally relates to aircraft flaps. More particularly, the disclosure relates to an aircraft flap actuator assembly which utilizes a combined curvilinear track shape and linkage to achieve a variety of flap positions and which can be enclosed in a reasonably small aerodynamic fairing.

BACKGROUND

Some modern commercial aircraft may utilize small trailing edge flap deployments to optimize cruise drag (known as "trailing edge variable camber" or TEVC). Optimally, these flap positions may involve angular changes-typically +/−2 degrees or less–with a minimum of fore/aft flap translation and little to no migration of the flap lower leading edge from contour. This minimized translation may be important so as to maintain good flap sealing with the wing lower surface, and also to minimize gaps in the flap support fairings. To date, this has been achieved using a simple low fowler motion flap mechanism (i.e. short hinge arm) which can, by its small size, minimize flap fore/aft travel in the TEVC range of motion.

A similar TEVC capability is desired with a high fowler motion flap mechanism, with a similar small fore/aft TEVC translation even though the mechanism may deliver a large amount of fore/aft flap extension for take-off and landing settings. It is recognized that such a high fowler flap may normally be positioned close to the aircraft aft spar, crowding spoiler drives as is often the case with existing airplanes. To address this condition the new mechanism may be entirely below the wing and may avoid intruding into the fixed trailing edge space between the aft spar and the flap nose, thereby allowing space for the spoiler mechanisms.

Therefore, an aircraft flap actuator assembly which utilizes a combined curvilinear track shape and linkage to achieve a variety of flap positions for high fowler motion and TEVC capability and which can be enclosed in a reasonably small aerodynamic fairing is needed.

SUMMARY

The disclosure is generally directed to an aircraft flap actuator assembly which utilizes a combined curvilinear track shape and linkage to achieve a variety of flap positions for high fowler motion and TEVC capability and which can be enclosed in a reasonably small aerodynamic fairing. An illustrative embodiment of the assembly includes at least one fixed support, at least one track having a curvilinear track surface connected to the fixed support, at least one flap support adapted to traverse the curvilinear track surface, a trailing edge flap connected to the at least one flap support and a flap actuator engaging the at least one flap support.

In some embodiments, the aircraft flap actuator assembly may include an airframe; a pair of fixed supports pivotally connected to the airframe; a pair of spaced-apart tracks having a pair of curvilinear track surfaces, respectively, connected to the fixed supports, respectively; a floating beam pivotally connected to the fixed supports, respectively; a tension link pivotally connected to the floating beam; an aft flap support pivotally connected to the tension link; a fore flap support spaced-apart with respect to the aft flap support; rollers carried by the fore flap support and adapted to traverse the curvilinear track surfaces; a trailing edge flap connected to the aft flap support and the fore flap support; and a flap actuator engaging the fore flap support.

In some embodiments, the aircraft flap actuator assembly may include a fixed support; a generally elongated, angled main linkage pivotally connected to the fixed support; a tension link pivotally connected to the main linkage; a flap linkage pivotally connected to the tension link; a generally curved track, an actuator linkage and at least one roller bogie pivotally connected to the flap linkage at a common pivot point; a trailing edge flap connected to the flap linkage; and a flap actuator pivotally engaging the actuator linkage.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The disclosure is generally directed to an aircraft flap actuator assembly which may combine high fowler motion with TEVC capability in a single mechanism. The mechanism for the assembly may be contained entirely below the lower surface of an aircraft wing to optimize space for drooping spoiler mechanisms. The assembly may combine a programming track/roller and floating 4-bar mechanism to allow a variety of low-speed flap positions as well as TEVC positions inside a reasonably small aerodynamic fairing.

Figure 1:
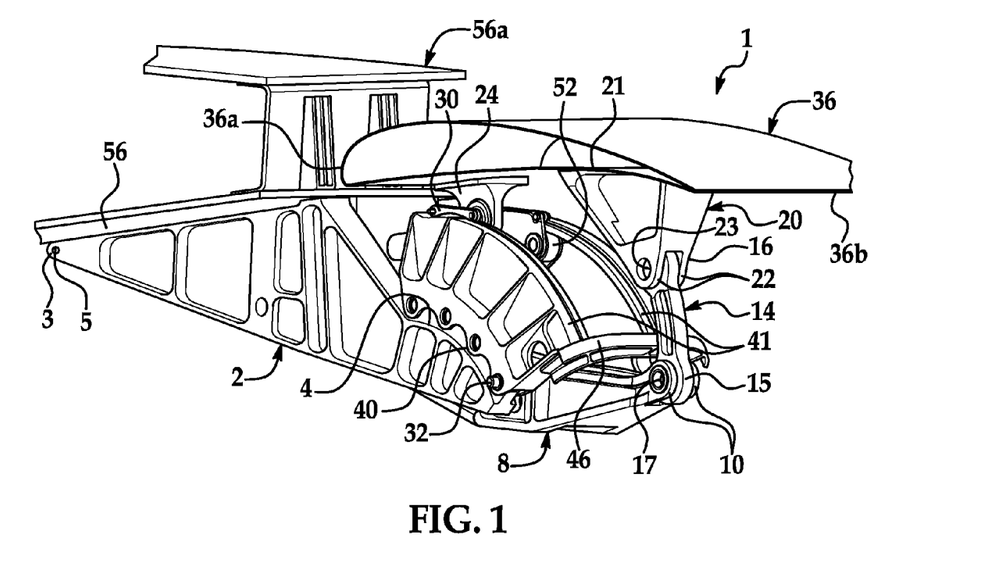
FIG. 1 is a sectional aft perspective view of an illustrative embodiment of the aircraft flap actuator assembly.
Figure 9:
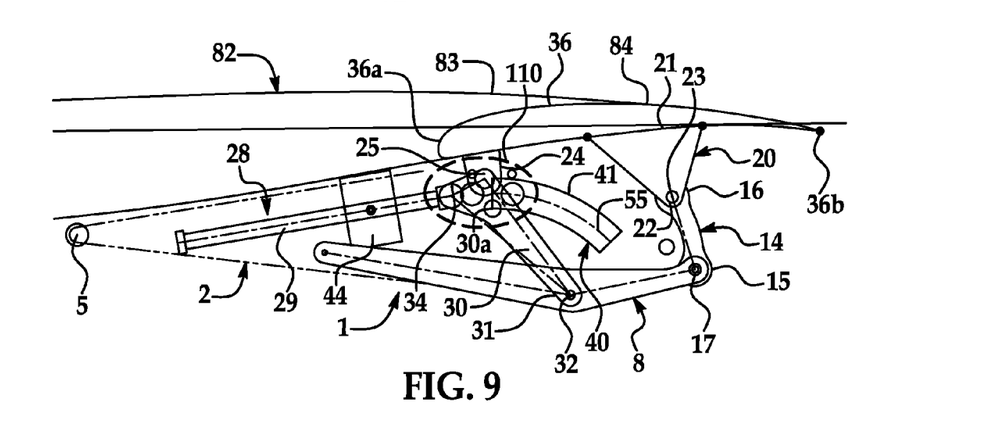
FIG. 9 is a side view illustrating the various linkages of the aircraft flap actuator assembly illustrated in FIG. 1.

Referring initially to FIGS. 1-6, 9 and 10, an illustrative embodiment of the aircraft flap actuator assembly, hereinafter assembly, is generally indicated by reference numeral 1. As illustrated in FIGS. 1 and 9, the assembly 1 may include a pair of generally elongated, parallel, spaced-apart fixed supports 2 (one of which is illustrated) each having a generally tapered end 3 and a curved surface 4 at an opposite end. The end 3 of each fixed support 2 may be attached to a wing box 56 of an aircraft wing 82 via an attachment 5.

Figure 3:
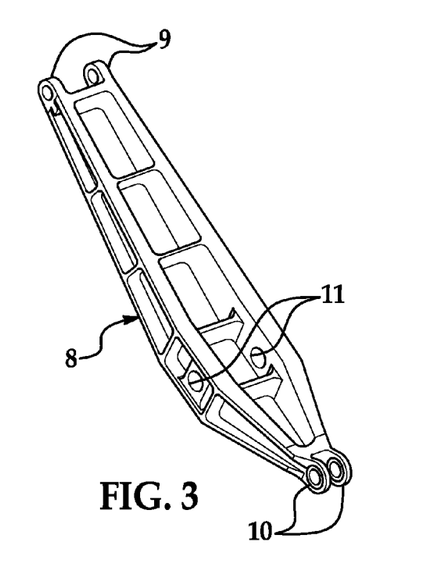
FIG. 3 is a perspective view of a floating beam.
Figure 4:
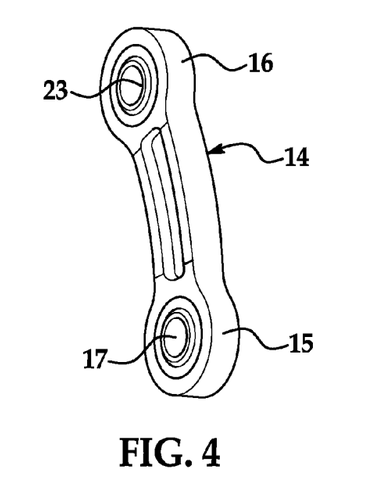
FIG. 4 is a perspective view of a tension link.

A generally elongated floating beam 8 may be disposed between the supports 2. As shown in FIG. 3, the floating beam 8 may have a pair of spaced-apart fore pivot flanges 9 at one end and a pair of spaced-apart aft pivot flanges 10 at an opposite end. A pair of intermediate pivot openings 11 may be provided in the floating beam 8 between the fore pivot flanges 9 and the aft pivot flanges 10. A generally elongated, curved tension link 14 may have a lower pivot eye 15 and an upper pivot eye 16 at respective ends. The fore pivot flanges 9 of the floating beam 8 may be pivotally attached to the fixed supports 2. The lower pivot eye 15 of the tension link 14 may be pivotally attached to the aft pivot flanges 10 of the floating beam 8 via a second pivot 17.

A pair of generally elongated, curved, spaced-apart programming tracks 40 each having a "swoopy" curvilinear track surface 41 may be provided on the curved surfaces 4 of the respective supports 2. The programming tracks 40 may be attached to the supports 2 using fasteners (not shown) and/or any other attachment technique which is suitable for the purpose. In some embodiments, the programming tracks 40 may be integral to the supports 2. This may require that the entire integrated structure be of a suitable material for a track surface. As shown in FIG. 1, a side load cross tie 46 may connect the programming tracks 40 on the opposite sides of the assembly 1 to each other.

An aft flap support 20 may have a generally triangular shape with a generally flat or planar flap support surface 21 forming the base of the triangle and a pair of spaced-apart pivot flanges 22 forming the apex of the triangle. The pivot flanges 22 may be pivotally attached to the upper pivot eye 16 of the tension link 14 via a third pivot 23. A aft portion of a trailing edge flap 36 may be supported by the flap support surface 21 of the aft flap support 20. The trailing edge flap 36 may have a leading edge 36a and a trailing edge 36b.

Figure 5:
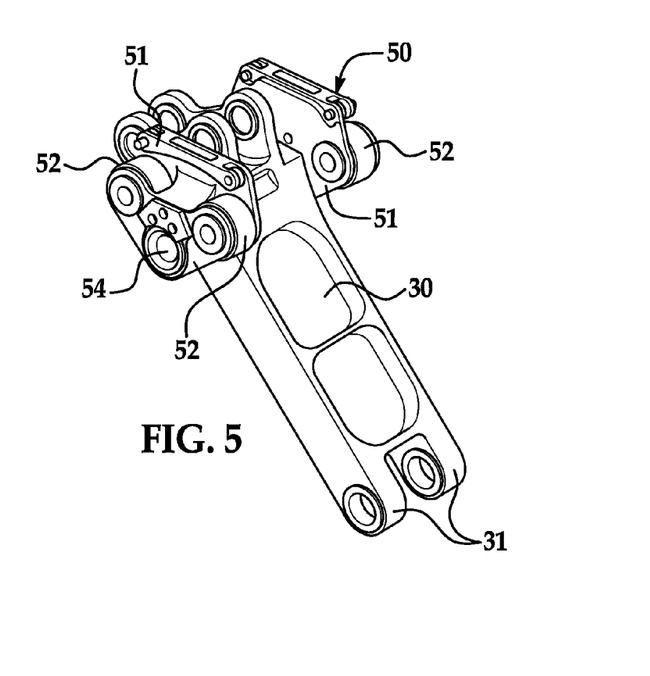
FIG. 5 is a perspective view of a compression link and a pair of roller bogies pinned to the compression link.
Figure 6:
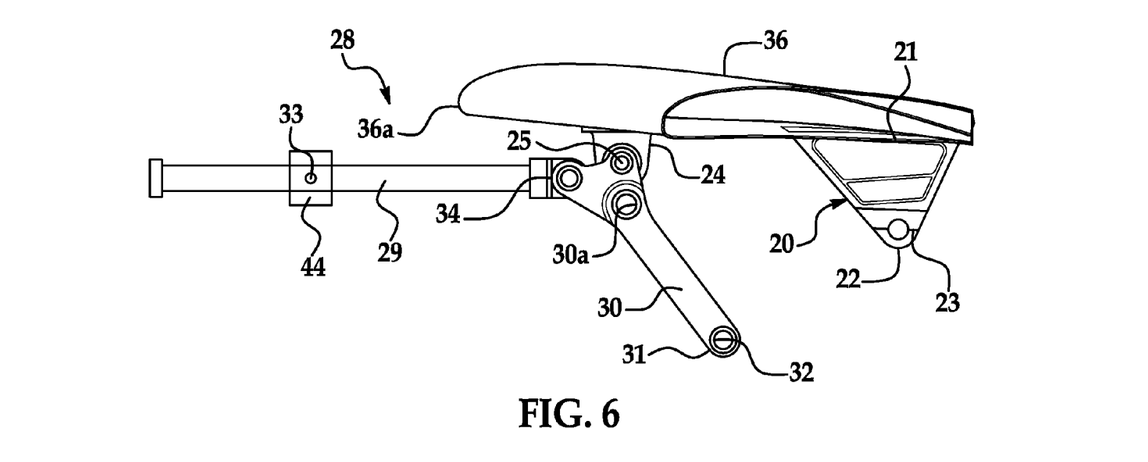
FIG. 6 is a side view of a flap actuator.
Figure 10:
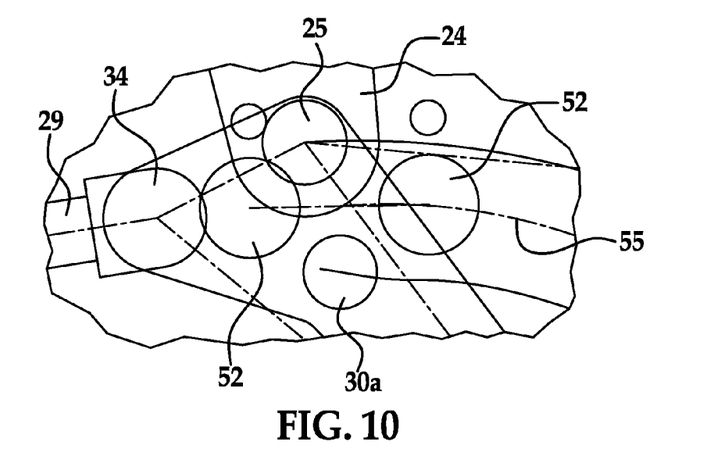
FIG. 10 is an enlarged sectional view taken along section line 10 in FIG. 9.

As shown in FIGS. 6, 9 and 10, a flap actuator 28 may operably engage the trailing edge flap 36 to facilitate positioning of the trailing edge flap 36 in a variety of positions with respect to an aircraft wing 82 (FIG. 9) as will be hereinafter described. In some embodiments, the flap actuator 28 may include a ball screw 29. A ball screw actuator 44 may drivingly engage the ball screw 29 to facilitate rotation and fore-aft movement of the ball screw 29. The ball screw 29 may engage a compression link 30 which in turn may operably engage a fore flap support 24 via a fourth pivot 25. The fore portion of the trailing edge flap 36 may be supported by the fore flap support 24. The compression link 30 may have a pair of spaced-apart pivot flanges 31 (FIG. 5) in its distal end. As shown in FIG. 1, a fifth pivot 32 may pivotally connect the pivot flanges 31 of the compression link 30 to the floating beam 8. The fifth pivot 32 may extend through the intermediate pivot openings 11 (FIG. 3) of the floating beam 8. The ball screw 29 may be attached to the flap actuator 44 at a sixth pivot 33 (FIG. 6). The ball screw 29 may be pivotally attached to the compression link 30 at a seventh pivot 34.

Figure 2:
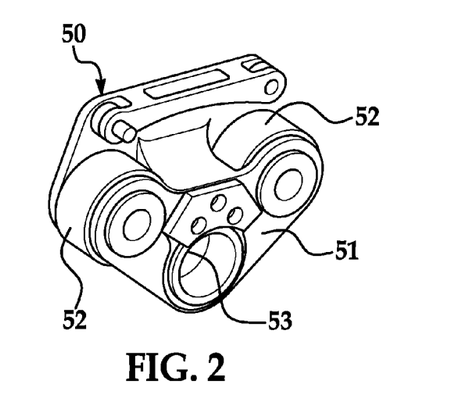
FIG. 2 is a perspective view of a roller bogie.

As shown in FIG. 5, a pair of roller bogies 50 may be provided on opposite sides of the connecting link 38. As shown in FIG. 2, the roller bogies 50 may each including a roller bogie frame 51. A pair of spaced-apart rollers 52 may be provided on the roller bogie frame 51. An attachment pin opening 53 may extend through the roller bogie frame 51 generally between the rollers 52. As shown in FIG. 5, the roller bogie frame 51 of each roller bogie 50 may be attached to the connecting link 38 by an attachment pin 54 which is extended through a corresponding attachment pin opening 53 and through a registering pin opening 30a (FIG. 6) in the connecting link 38 and the proximal end of the compression link 30. As shown in FIG. 1, the rollers 52 of each roller bogie 50 may engage and traverse the curvilinear track surface 41 of a corresponding programming track 40 along a roller path 55 (FIGS. 9 and 10) responsive to operation of the flap actuator 28.

Responsive to operation of the flap actuator 28, the flap 36 may be deployed between an uppermost position (FIG. 11) and a lowermost position (FIG. 17) as the rollers 52 of the roller bogies 50 travel on the curvilinear track surfaces 41 of the programming tracks 40. Accordingly, the leading edge 36a of the trailing edge flap 36 may be operatively positioned by the curvilinear track surfaces 41 of the programming tracks 40 through the fore flap support 24 while the trailing edge 36b of the trailing edge flap 36 may be operatively positioned by the floating beam 8, the tension link 14 and the aft flap support 20. Simultaneously, the various components of the assembly 1 may pivot with respect to the second pivot 17, the third pivot 23, the fourth pivot 25, the fifth pivot 32, the sixth pivot 33 and the seventh pivot 34.

Figure 11:
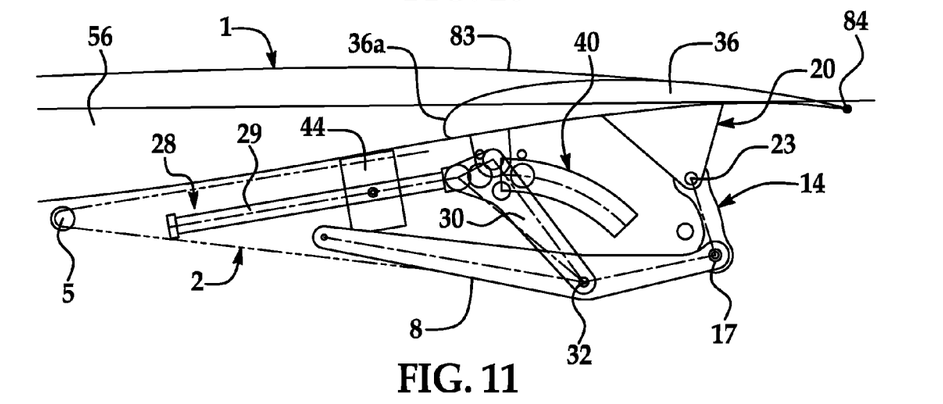
FIG. 11 is a side view of the aircraft flap actuator assembly in FIG. 1, with the flap deployed in the "up" position.
Figure 12:
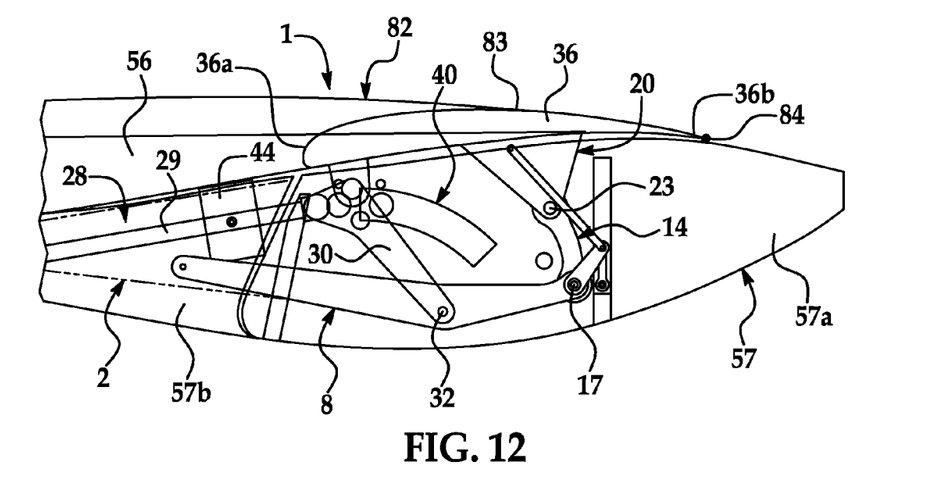
FIG. 12 is a side view of the aircraft flap actuator assembly in FIG. 1, with the flap deployed in the "up" position and the fairing in which the assembly is contained shown.

Referring next to FIGS. 11-20, in exemplary application the entire assembly 1 may be contained within an aerodynamic fairing 57 which may have an aft fairing portion 57a and a fore fairing portion 57b attached to the underside of each aircraft wing 82 of an aircraft, as shown in FIG. 12. The relative positions of the assembly 1 when the trailing edge flap 36 is deployed in the uppermost (cruising) position are shown in FIG. 11 (in which the fairing 57 is omitted) and FIG. 12 (in which the fairing 57 is shown). Accordingly, the trailing edge flap 36 may be deployed beneath the wing surface 83 of the aircraft wing 82 and may not be coincident with the wing trailing edge 84 of the aircraft wing 82. The tension link 14 may be deployed in a generally vertical orientation.

Figure 13:
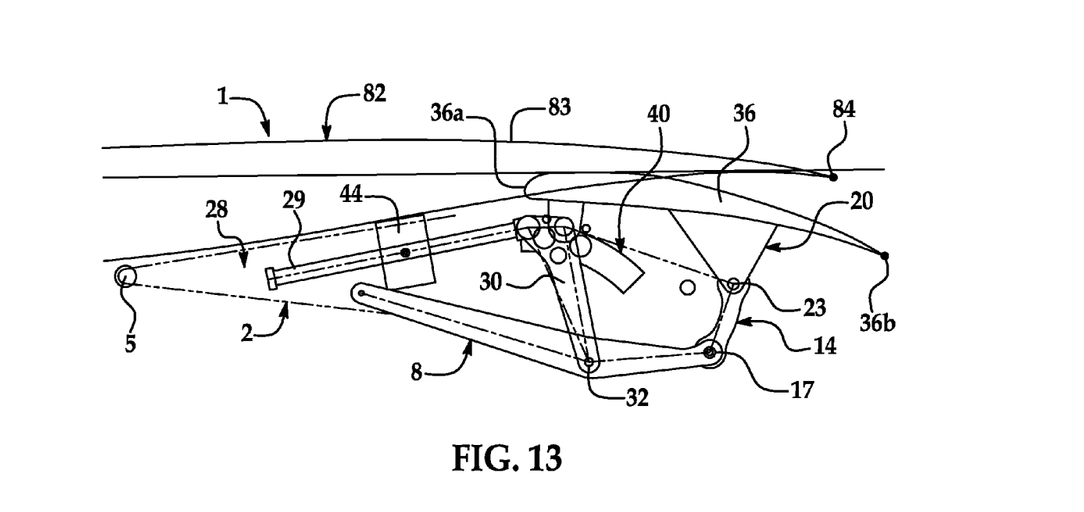
FIG. 13 is a side view of the aircraft flap actuator assembly in FIG. 1, with the flap deployed in the "take-off" position.
Figure 14:
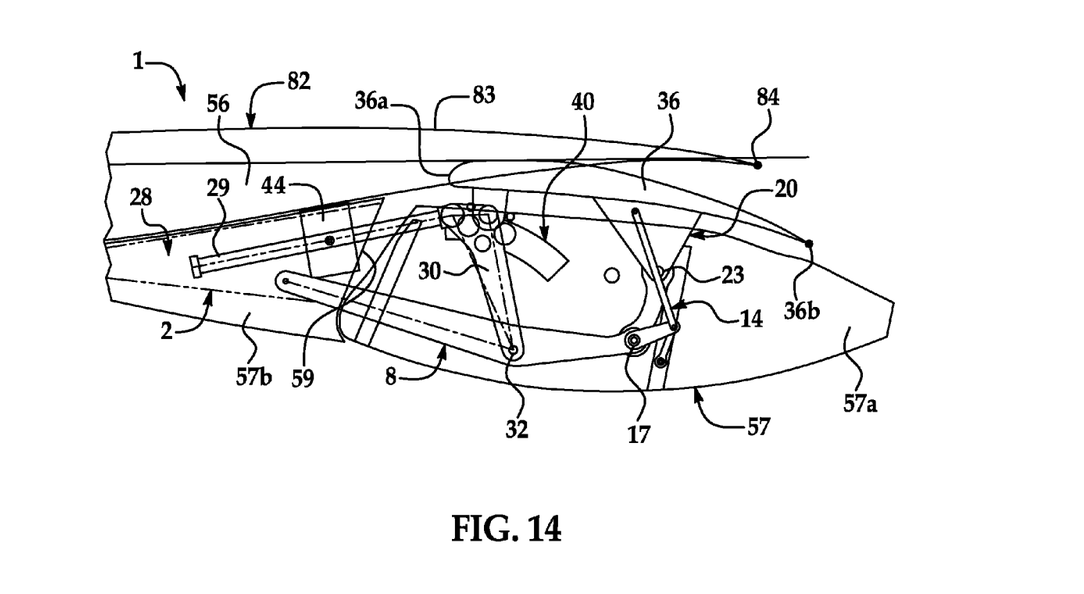
FIG. 14 is a side view of the aircraft flap actuator assembly in FIG. 1, with the flap deployed in the "take-off" position and the fairing in which the assembly is contained shown.

In FIGS. 13 and 14, the flap actuator 28 has been operated to deploy the trailing edge flap 36 in a take-off position. Accordingly, the trailing edge flap 36 may protrude aftwardly from the wing trailing edge 84. As shown in FIG. 14, a fairing gap 59 may form between the aft fairing portion 57a and the fore fairing portion 57b of the fairing 57.

Figure 15:
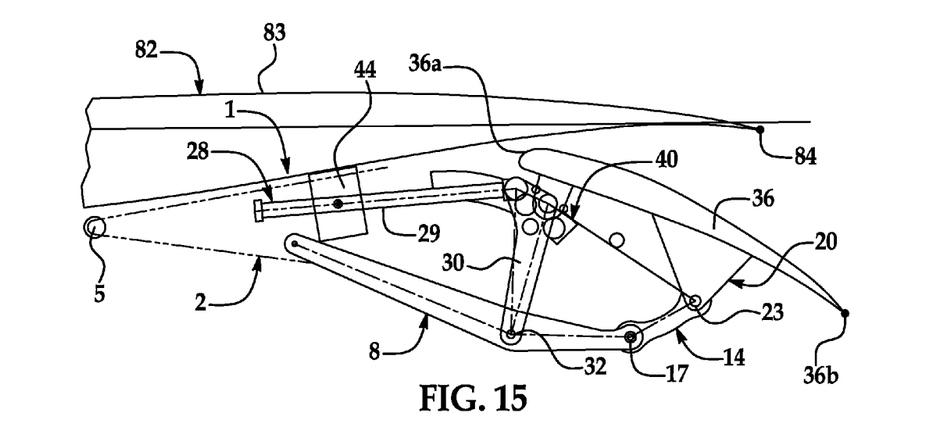
FIG. 15 is a side view of the aircraft flap actuator assembly in FIG. 1, with the flap deployed in an alternative "take-off" position.
Figure 16:
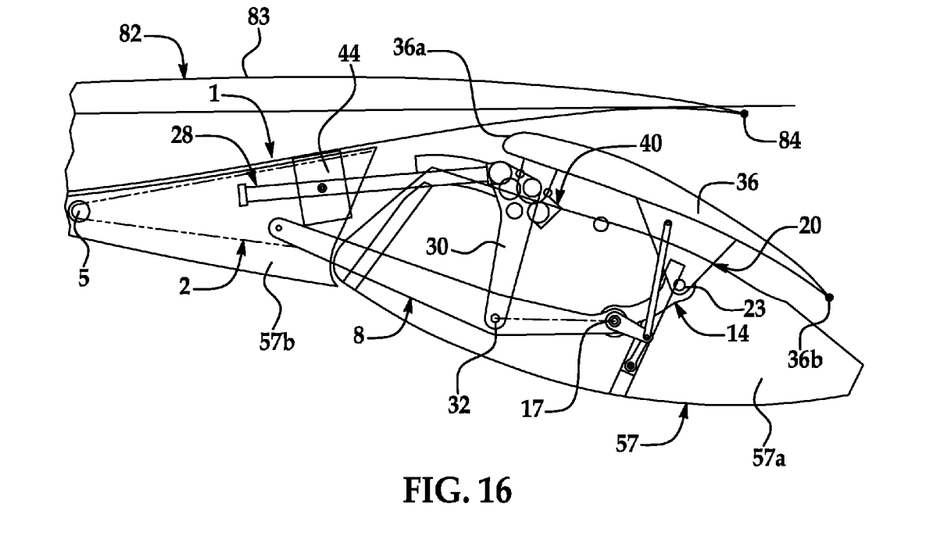
FIG. 16 is a side view of the aircraft flap actuator assembly in FIG. 1, with the flap deployed in the alternative "take-off" position and the fairing in which the assembly is contained shown.
Figure 17:
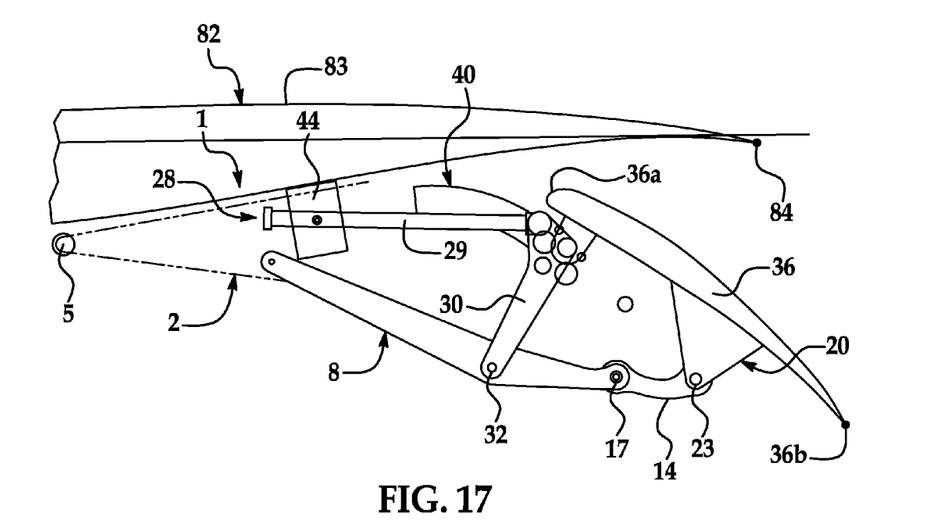
FIG. 17 is a side view of the aircraft flap actuator assembly in FIG. 1, with the flap deployed in a "landing" position.
Figure 18:
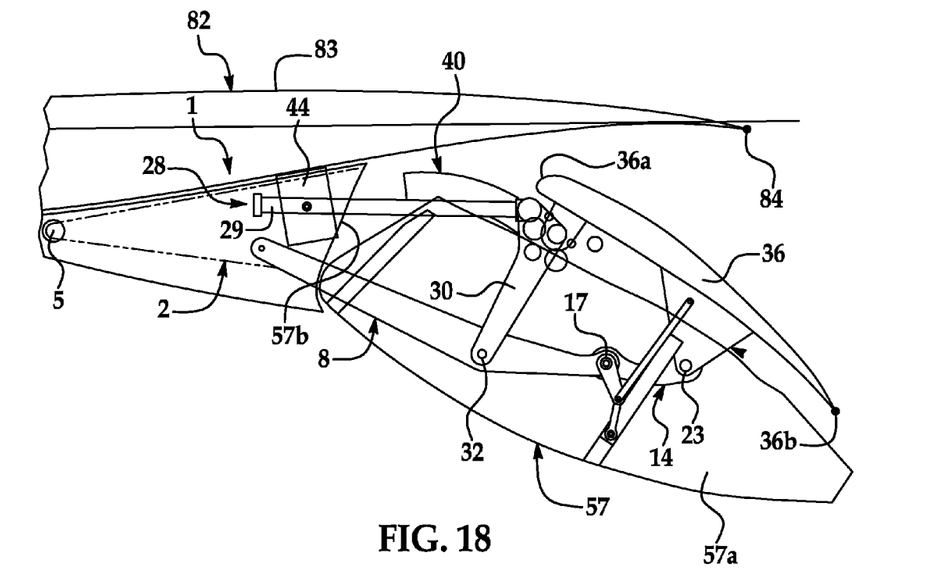
FIG. 18 is a side view of the aircraft flap actuator assembly in FIG. 1, with the flap deployed in the "landing" position and the fairing in which the assembly is contained shown.
Figure 19:
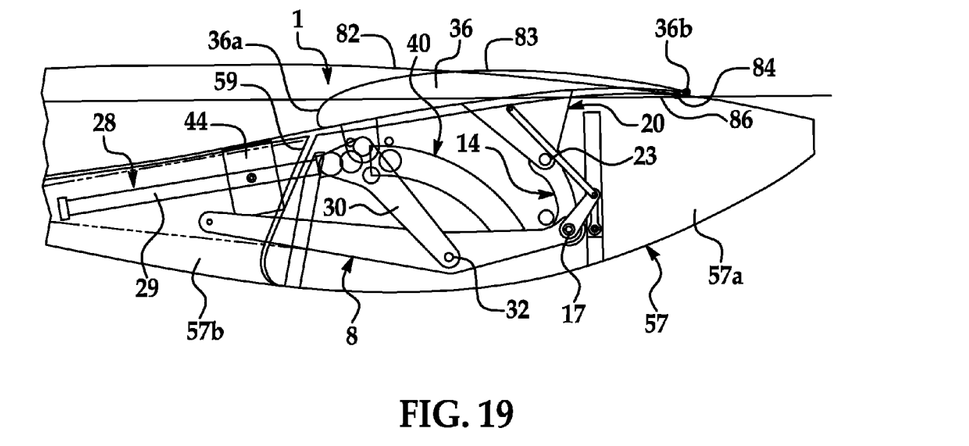
FIG. 19 is a side view of the aircraft flap actuator assembly illustrated in FIG. 1, illustrating a minimized gap between the fore and aft fairings with the flap deployed in the "TEVC up" position.
Figure 20:
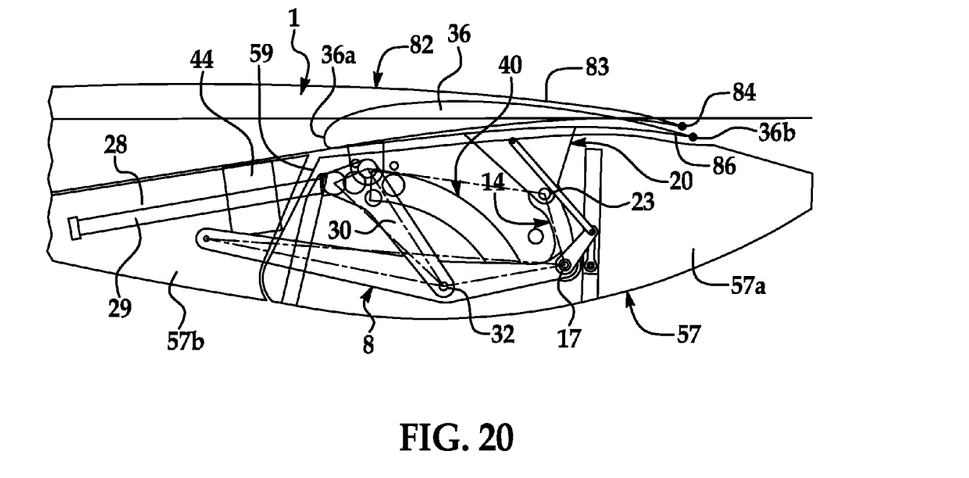
FIG. 20 is a side view of the aircraft flap actuator assembly illustrated in FIG. 1, illustrating a minimized gap between the fore and aft fairings with the flap deployed in the "TEVC down" position.

In FIGS. 15 and 16, an alternative take-off position of the trailing edge flap 36 is shown with the aft fairing portion 57a and the fore fairing portion 57b omitted in FIG. 15 and shown in place in FIG. 16. In FIGS. 17 and 18, a landing position of the trailing edge flap 36 is shown. The fairing gap (FIG. 18) has widened and the tension link 14 has assumed a generally horizontal orientation. As shown in FIG. 19, when the flap 36 is deployed in the TEVC up position, and by virtue of the programming track shape, which is shown in FIG. 10, the fairing gap 59 may be minimized and the flap and fairing seal 86 between the flap 36 and the aft fairing portion 57a may be sufficiently maintained. As shown in FIG. 20, when the flap 36 is deployed in the TEVC down position, and by virtue of the programming track shape, the fairing gap 59 may be minimized and the flap and fairing seal 86 between the flap 36 and the aft fairing portion 57a may be sufficiently maintained.

The assembly 1 may be capable of imparting flap angle changes near the stowed position for adjusting cruise camber and providing large fowler displacements when deployed. Furthermore, by profiling the programming track to a non-linear shape locally, as shown in FIG. 10, the assembly 1 may impart very little fowler motion to the flap near the stowed position so as to minimize any gaps at the spoiler and the articulating portion of the flap fairing 57, thus maintaining aerosmoothness. The assembly 1 may be arranged so that the majority of the drive elements are contained within the envelope of the flap fairing 57, providing more space for accommodating the spoiler drive system and, if needed, a drooped spoiler.

The assembly 1 may facilitate high fowler motion with good flexibility for desired positions of the trailing edge flap 36. The assembly 1 may move the flap 36 a long distance without requiring an overly deep aero fairing (as a simple hinge may require). Moreover, the linkage-type mechanism utilized by the assembly 1 may provide reasonable flexibility depending on its kinematic characteristics but may be constrained by the simple motion of its components. A pure track and carriage mechanism which can be shaped in any way which is needed to better attain the desired flap positions may offer optimum flexibility but with the accompanying weight of such a system. The assembly 1 approaches the flexibility of a pure track but with less weight and perhaps a smaller aero fairing which may reduce drag.

The assembly 1 may have kinematics which are optimized to not only provide high fowler motion but also provide at least +/− two degrees of TEVC within a range of flap fore/aft translation which may be sufficiently small to allow a good aero dynamic seal to the wing lower surface and minimal gapping of the aero fairings, as shown in FIG. 10. These may be important for maintaining low drag in high speed flight. Simple circular motion (which a simple hinge may provide) may require more flap translation to attain the same TEVC angle for similar fowler motion.

The assembly 1 may be compatible with drooped spoiler operation. Some modern aircraft may use drooping spoilers in addition to flap deployment to attain a more effective low-speed wing section. Since normally flight spoilers may deploy only upwards, any downward movement capability may require increased stroke actuators and the attendant longer and larger spoiler drive components. Flap mechanisms may tend to use the same space in the fixed trailing edge (FTE) cavity as do spoiler mechanisms and/or the drooped spoilers themselves, which may create system integration difficulties that may be compounded with drooped spoilers. For the most part, the assembly 1 may stay clear of the FTE.

Additionally, with the programming track 40, the mechanism may be flexible enough to accommodate a range of drooped spoiler angles and gaps, as desired.

Figure 7:
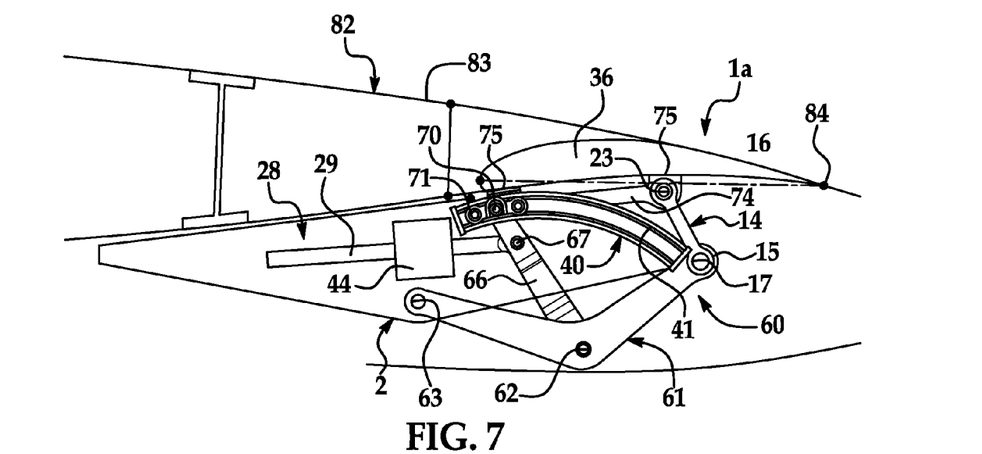
FIG. 7 is a side view of an alternative illustrative embodiment of the aircraft flap actuator assembly.
Figure 8:
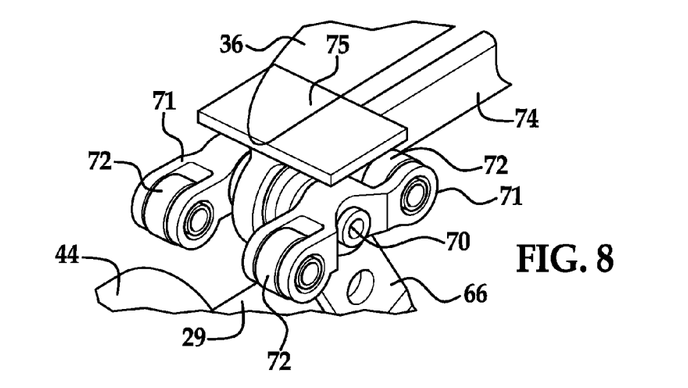
FIG. 8 is a perspective view illustrating a combined joint between a pair of roller bogies, an actuator linkage and a flap linkage of the assembly in FIG. 7.

Referring next to FIGS. 7 and 8, an alternative illustrative embodiment of the aircraft flap actuation assembly 1a may include a generally elongated, angled main linkage 61. A first pivot 63 may pivotally attach the main linkage 61 to the fixed support 2. The lower pivot eye 15 of the tension link 14 may be pivotally attached to the main linkage 61 at a second pivot 17. A generally elongated flap linkage 74 may be pivotally attached to the upper pivot eye 16 of the tension link 14 at a third pivot 23. The flap linkage 74 may have a pair of spaced-apart flap attachment surfaces 75 to which the trailing edge flap 36 may be attached. The programming track 40, the flap linkage 74, an actuator linkage 66 and a pair of roller bogies 71 each having a pair of rollers 72 (FIG. 8) may be pivotally attached at a common pivot joint 70. The actuator linkage 66 may engage the main linkage 61 at a central pivot 62 between the first pivot 63 and the second pivot 17. The ball screw 29 of the flap actuator 28 may pivotally engage the actuator linkage 66 between the common pivot joint 70 and the central pivot 62 at an intermediate pivot 67. Accordingly, operation of the flap actuator 28 may translate fore and aft movement from the ball screw 29 to the trailing edge flap 36 through the actuator linkage 66 and the flap linkage 74 as the rollers 72 of the roller bogies 71 traverse the curvilinear track surface 41 of the programming track 40.

Figure 21:
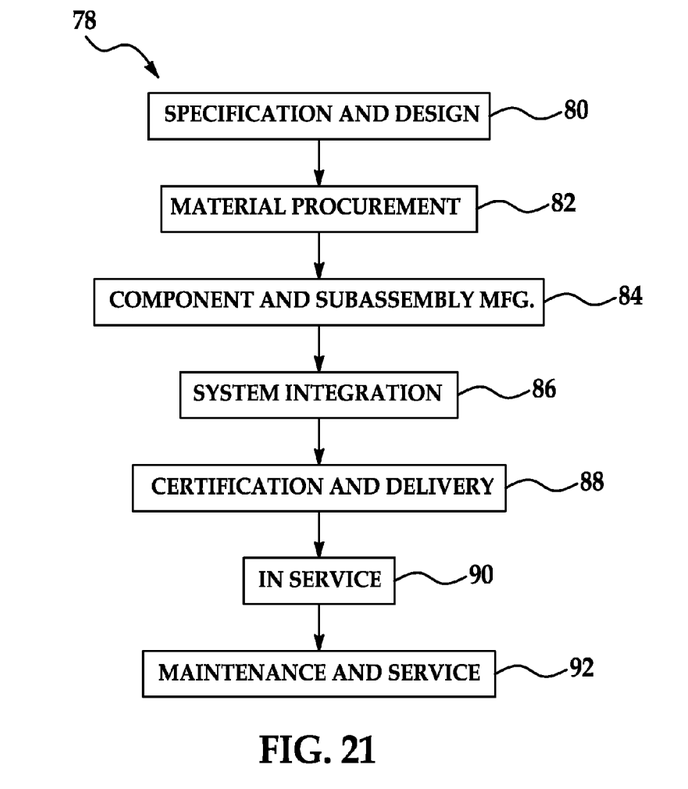
FIG. 21 is a flow diagram of an aircraft production and service methodology.
Figure 22:
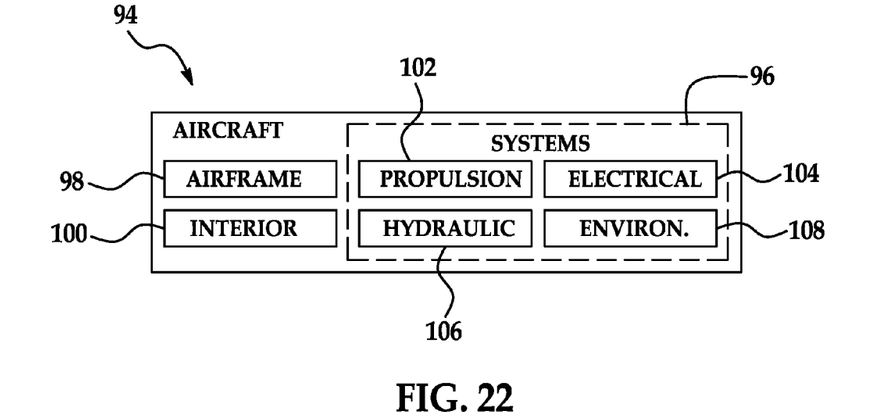
FIG. 22 is a block diagram of an aircraft.

Referring next to FIGS. 21 and 22, embodiments of the disclosure may be used in the context of an aircraft manufacturing and service method 78 as shown in FIG. 21 and an aircraft 94 as shown in FIG. 22. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94.

Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An aircraft flap actuator assembly, comprising:
    at least one fixed support:
    at least one track having a curvilinear track surface fixedly connected to the fixed support;
    a floating beam, directly pivotally connected to the fixed support;
    a fore flap support adapted to traverse the curvilinear track surface;
    an aft flap support, pivotally connected to the floating beam and spaced-apart from the fore flap support;
    a trailing edge flap fixedly connected to the fore and aft flap supports; and
    a flap actuator connected to the fore flap support.

2. The assembly of claim 1 wherein the flap actuator comprises a ball screw engaging the fore flap support and a ball screw actuator engaging the ball screw.

3. The assembly of claim 1, further comprising a tension link pivotally connected between the floating beam and the aft flap support.

4. The assembly of claim 1, further comprising at least one roller bogie connected to the fore flap support and engaging the curvilinear track surface.

5. The assembly of claim 4 wherein the flap actuator comprises a ball screw and a compression link pivotally engaged by the ball screw and connected between the fore flap support and the floating beam.

6. The assembly of claim 5 wherein the at least one roller bogie is connected to the compression link.

7. The assembly of claim 1 further comprising a fairing enclosing the at least one track, the at least one flap support and the flap actuator.

\* \* \* \* \*